United States Patent
Langanki et al.

(10) Patent No.: US 8,905,226 B2
(45) Date of Patent: Dec. 9, 2014

(54) CONTAINER HANDLING ARRANGEMENT WITH ADJUSTABLE HANDLING STRUCTURES FOR HANDLING DIFFERENT CONTAINERS AND GROUPS OF CONTAINERS, AND A METHOD OF ADJUSTING ADJUSTABLE HANDLING STRUCTURES FOR HANDLING DIFFERENT CONTAINERS AND GROUPS OF CONTAINERS

(75) Inventors: Dirk Langanki, Issum (DE); Lothar Wess, Kieve (DE); Christoph Koster, Kieve (DE); Dirk Kopp, Goch (DE)

(73) Assignee: KHS GmbH, Dortmund (DE)

( * ) Notice: Subject to any disclaimer, the term of this patent is extended or adjusted under 35 U.S.C. 154(b) by 209 days.

(21) Appl. No.: 12/858,687

(22) Filed: Aug. 18, 2010

(65) Prior Publication Data

US 2011/0040403 A1    Feb. 17, 2011

Related U.S. Application Data

(63) Continuation-in-part of application No. PCT/EP2009/000857, filed on Feb. 6, 2009.

(30) Foreign Application Priority Data

Feb. 19, 2008    (DE) .......................... 10 2008 010 076

(51) Int. Cl.
    B65G 47/86        (2006.01)
    (Continued)

(52) U.S. Cl.
    CPC .................................. B65G 21/2072 (2013.01)
    USPC .............. 198/803.11; 198/341.01; 198/473.1;
                     198/836.1; 700/112; 700/230; 53/504

(58) Field of Classification Search
    CPC ........... B65G 21/14; B65G 2201/0244; B65G
                 2201/0247; B65G 43/08; B65G 51/035;
                 B65B 25/146; B65B 59/02; B67C 2007/006
    USPC .............. 700/95, 112, 213, 228–230; 53/235,
                     53/255, 257, 52, 201, 493, 498, 504;
                     414/444, 453, 455, 609, 617, 900;
                     198/301, 312, 341.01, 349, 355, 463.1,
                     198/469.1, 473, 523–525, 535, 538, 570,
                     198/586, 615, 618, 793, 803.11, 836.1,
                     198/836.3, 837, 860.1, 861.1, 867.01,
                     198/867.02, 867.08, 351, 473.1, 15
    See application file for complete search history.

(56) References Cited

U.S. PATENT DOCUMENTS 3,982,338 A * 9/1976 Dick et al. .................. 37/463
4,565,048 A   1/1986 Lade
(Continued)

FOREIGN PATENT DOCUMENTS

DE    34 10 685 A1    10/1985
DE    198 03 820 A1    8/1999
(Continued)

OTHER PUBLICATIONS

International Search Report PCT/EP2009/00857 and English translation thereof.
(Continued)

*Primary Examiner* — Crystal J Barnes-Bullock
(74) *Attorney, Agent, or Firm* — Nils H. Ljungman & Associates (57) ABSTRACT

Handling arrangement for handling individual containers or groups of containers having movable container handling structures for handling containers being moved thereby. Each of the container handling structures is adjustable using one or more positioning devices. Upon changing container types and/or container groupings, the container handling structures can be adjusted in their positions so as to handle the different containers.

16 Claims, 2 Drawing Sheets

(51) Int. Cl.
*B65G 49/06* (2006.01)
*B65G 47/84* (2006.01)
*B65G 39/18* (2006.01)
*G06F 19/00* (2011.01)
*G06F 7/00* (2006.01)
*B65G 21/20* (2006.01)

(56) References Cited

U.S. PATENT DOCUMENTS

| | | | | |
|---|---|---|---|---|
| 5,718,325 A | * | 2/1998 | Doster et al. | 198/592 |
| 5,784,857 A | * | 7/1998 | Ford et al. | 53/201 |
| 6,067,780 A | * | 5/2000 | Gentili et al. | 53/504 |
| 6,305,528 B1 | | 10/2001 | Leonard | |
| 6,578,702 B2 | * | 6/2003 | Falkowski | 198/836.3 |
| 6,640,961 B2 | * | 11/2003 | Cavallari | 198/460.2 |
| 6,827,203 B2 | * | 12/2004 | Andreoli et al. | 198/836.3 |
| 6,827,678 B1 | | 12/2004 | Kuempel | |
| 7,104,029 B2 | | 9/2006 | Tassin et al. | |
| 7,310,929 B2 | * | 12/2007 | Dow et al. | 56/192 |
| 7,654,386 B2 | * | 2/2010 | Dall'omo et al. | 198/803.13 |
| 7,707,805 B2 | * | 5/2010 | Gorrieri | 53/463 |
| 7,735,636 B2 | | 6/2010 | Lundberg | |
| 7,882,946 B2 | * | 2/2011 | Hein et al. | 198/807 |
| 7,891,479 B2 | * | 2/2011 | Evangelista et al. | 198/312 |
| 2003/0085104 A1 | | 5/2003 | Falkowski | |

FOREIGN PATENT DOCUMENTS

| | | |
|---|---|---|
| DE | 603 03 124 T2 | 7/2006 |
| EP | 1 773 694 A | 4/2007 |
| WO | WO 94/12412 | 6/1994 |
| WO | WO 2005/118437 | 12/2005 |

OTHER PUBLICATIONS

German Office Action 10 2008 010 076.5-27.

* cited by examiner

CONTAINER HANDLING ARRANGEMENT WITH ADJUSTABLE HANDLING STRUCTURES FOR HANDLING DIFFERENT CONTAINERS AND GROUPS OF CONTAINERS, AND A METHOD OF ADJUSTING ADJUSTABLE HANDLING STRUCTURES FOR HANDLING DIFFERENT CONTAINERS AND GROUPS OF CONTAINERS

CONTINUING APPLICATION DATA

This application is a Continuation-In-Part application of International Patent Application No. PCT/EP2009/00857, filed on Feb. 6, 2009, which claims priority from Federal Republic of Germany Patent Application No. 10 2008 010 076.5, filed on Feb. 19, 2008. International Patent Application No. PCT/EP2009/00857 was pending as of the filing date of this application. The United States was an elected state in International Patent Application No. PCT/EP2009/00857.

BACKGROUND

1. Technical Field

The present application relates to a system for handling and/or treating packaging means and method for the format-compatible adjustment of such a system, a method for adjusting the format or changing-over the format of a system configured to treat, handle, and process containers or groups of containers, and an arrangement therefor.

2. Background Information

The most varied forms of systems for processing and/or handling and/or treating packaging means are known, for example also in the form of machines for cleaning and/or filling and/or closing and/or labeling and/or packing and/or palletizing.

Packaging means in terms of the present application are generally such that are used to accommodate packaged products or liquid products, for example the most varied types of containers, such as, for example, cans, bottles, etc. In addition, packaging means in terms of the present application are also groups or sets of packaging means comprising the most varied types of containers.

A transport section in terms of the present application refers to that section on which the packaging means are moved through the relevant system. Consequently, conveyors of arbitrary design in the respective system and elements of said system that transport the packaging means form part of the transport section, i.e., among other things, also the transport stars of arbitrary design and their associated elements (for example, guide curves, etc.) that are for example to be found in systems for processing containers, but also rotating transport elements or rotors of processing systems and/or handling and/or treating systems and/or processing systems for the most varied types of packaging means. Transport sections in terms of the present application also relate to other conveyors for supplying and discharging the packaging means to and from a system as well as transporting the packaging means between processing machines in a system.

In the beverage industry, containers with different formats are frequently handled in one system, i.e. containers with different exterior dimensions, and/or shapes and/or of different types, etc. In addition, said different containers are also presented in different types of packaging or sets or formats. To adapt a system to these different formats of containers, for example bottles, cans or the like, but also to adapt to different set formats, it is usual to replace entire assemblies of format-dependent function elements or format parts (e.g. guide curves) that interact with the containers or the sets. In addition it is usual and necessary and/or desired to adjust, in a format-compatible manner, the format-dependent function elements that interact with the containers or sets, for example when there is a change in format. Said adjustment has been effected manually up to now by the operating personnel, the adjustments having to be performed manually at a plurality of adjusting positions.

In the case of conventional systems, as are used in the beverage industry, when there is a format adjustment or a format changeover, adjustments are necessary and/or desired at up to two hundred different adjusting positions, which implies a considerable amount of work and expenditure, for example whenever a plurality of containers or sets with a different format are to be handled on one and the same system. In many cases up to thirty different formats are treated on one system.

It must or should also be taken into account that for each format adjustment or format changeover—proceeding from the preceding setting of the format-dependent function elements—in each case changing function elements, that is to say other function elements, have to be adjusted to new REQUIRED values. In addition, it can also be necessary and/or desired to adjust the changed function elements to other setting values.

In addition, it must or should also be taken into account that in the case of many machines, for example in the case of packaging machines or packaging systems, when there is a format adjustment or a format changeover, a predetermined sequence of adjustments also has to or should be adhered to in order to avoid, restrict, and/or minimize incorrect adjustments and/or damage to the system or to its machines and/or to the function elements (for example guiding means).

Up to now the format adjustment or format changeover in a system has therefore required and/or desired, on account of the large number of adjusting positions, a large amount of work and time expenditure with the risk of a high error rate caused by incorrect adjustment. In addition, up to now the format adjustment or format changeover has also required and/or desired high cost expenditure, for example if the machine has had to be at a standstill for a long time during the adjustment.

Another cost factor frequently referred to is the so-called start-up losses, which are incurred when the system is restarted and the packaging means are damaged or destroyed due to incorrectly adjusted function elements.

OBJECT OR OBJECTS

It is an object of the present application to provide a system that avoids, restricts, and/or minimizes the aforementioned disadvantages and makes possible a simple format adjustment or format changeover.

SUMMARY

This object is achieved through a system for processing and/or handling and/or treating packaging means that are moved through the system on a transport section. The said system may include a plurality of format-dependent function elements, which are provided on said transport section and interact with the packaging means. The system may also comprise adjusting devices that are provided at adjusting positions of the system for a format-compatible adjustment of the format-dependent function elements that interact with the packaging means. The system may also comprise a central control unit, in which at least the format-compatible adjustments necessary and/or desired at the adjusting positions for different formats of packaging means are stored in a storage medium as setting data or REQUIRED values, said control unit providing said data for a format adjustment and/or format changeover of the system. This object may also be achieved by a system for handling and/or treating packaging means that are moved through the system on a transport section. The system may include a plurality of format-dependent function elements, which are provided on said transport section and interact with the packaging means. The system may also comprise adjusting devices that are provided at adjusting positions of the system for a format-compatible adjustment of the format-dependent function elements that interact with the packaging means. The system may also comprise at least one mobile adjusting device, which has a motor-driven drive and is couplable to the adjusting devices of the function elements for a motor-driven, format-compatible adjustment of said format-dependent function elements. This object may also be achieved by a method for adjusting the format or changing-over the format of a system for processing and/or handling and/or treating packaging means, which are moved through the system on a transport section. The system comprises a plurality of format-dependent function elements that are provided on the transport section and interact with the packaging means, as well as adjusting devices that are provided at adjusting positions of the system for a format-compatible adjustment of the format-dependent function elements that interact with the packaging means. The adjusting of the system is effected in a manner supported by the control unit, in which at least the format-compatible adjustments necessary and/or desired at the adjusting positions for different formats of packaging means are stored in a storage medium as setting data or required and/or desired values. The control unit may provide the data for a format adjustment and/or format changeover.

The present application makes possible a rapid, in one possible embodiment also simplified, reliable format adjustment or format changeover.

The present application relates to a system for processing and/or handling and/or treating packaging means that are moved through the system on a transport section. The system may include a plurality of format-dependent function elements, which are provided on said transport section and interact with the packaging means. The system may also comprise adjusting devices that are provided at adjusting positions of the system for a format-compatible adjustment of the format-dependent function elements that interact with the packaging means. The present application may also relate to a system for handling and/or treating packaging means that are moved through the system on a transport section. The system may include a plurality of format-dependent function elements, which are provided on said transport section and interact with the packaging means. The system may also comprise adjusting devices that are provided at adjusting positions of the system for a format-compatible adjustment of the format-dependent function elements that interact with the packaging means. The present application may also relate to a method for adjusting the format or changing-over the format of a system for processing and/or handling and/or treating packaging means. The packaging means are moved through the system on a transport section. The system comprises a plurality of format-dependent function elements that are provided on the transport section and interact with the packaging means, as well as adjusting devices that are provided at adjusting positions of the system for a format-compatible adjustment of the format-dependent function elements that interact with the packaging means.

Further developments, embodiments, and conversion possibilities of the present application are produced from the following description of possible embodiments and from the Figures. The features described and/or graphically represented here, individually or in arbitrary combination, are in principle the object of the present application.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in more detail below by way of the following.

DESCRIPTION OF EMBODIMENT OR EMBODIMENTS

Figure 1:
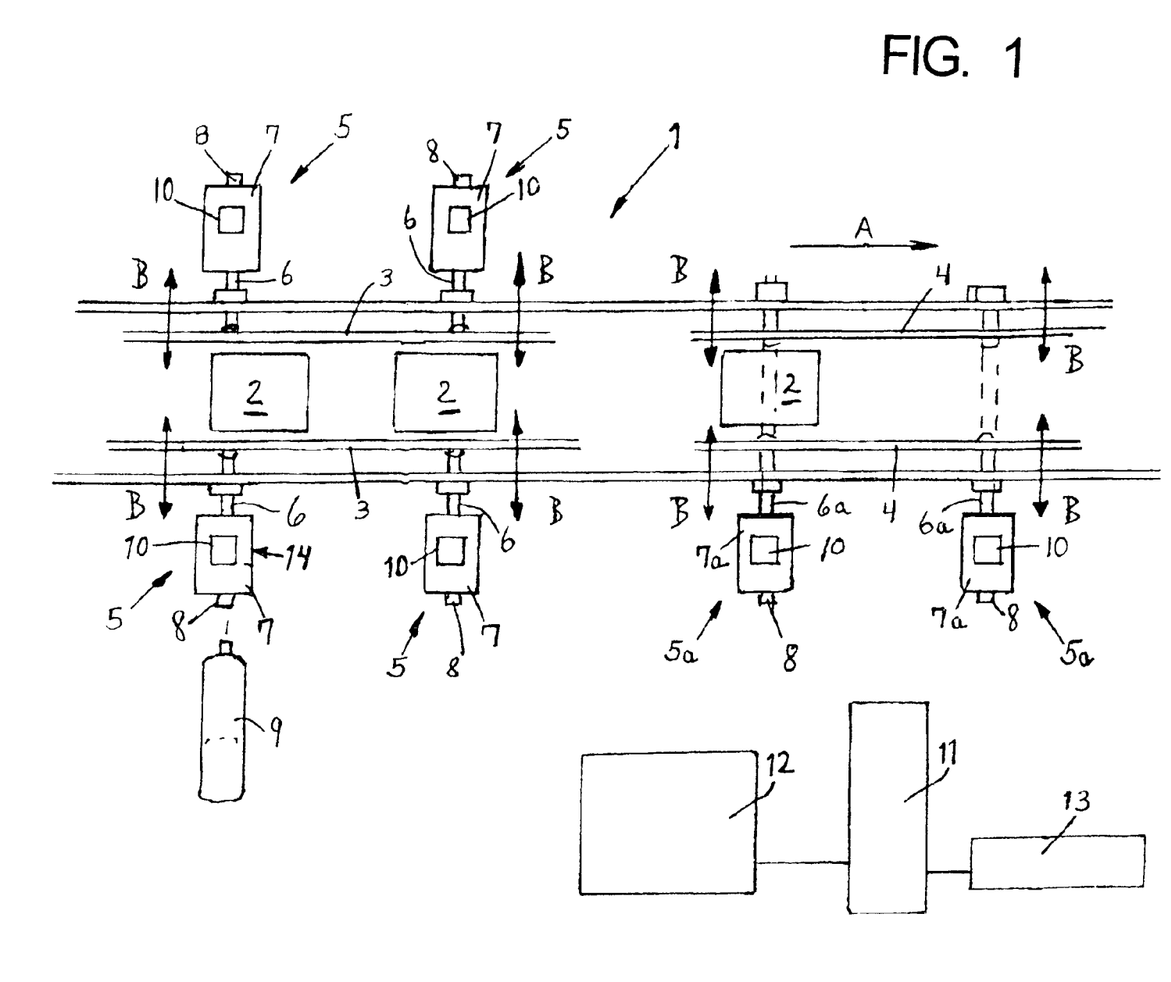
FIG. 1, which shows a very simplified representation and top view of a segment of a transport section for packaging means.

FIG. 1 shows a segment of a transport section 1 for packaging means 2. The packaging means 2, which are also represented in a very schematic manner as a block, are, for example, the most varied kinds of containers, such as, for example, cans, bottles, etc. Packaging means 2, however, are also container groups or sets made up by the most varied types of containers.

The transport section 1, on which the packaging means 2 are moved in a horizontal or substantially horizontal direction of transport A, is a component of an otherwise not represented processing system or a treating system and/or handling system for the packaging means 2, for example of a machine for cleaning and/or filling and/or closing and/or labeling and/or packaging and/or palletizing that is designed in a manner that is known in principle to the expert.

The transport section 1, among other things, has format-dependent function elements, which interact with the packaging means 2 at least with regard to their positioning and which, have to be exchanged and/or adjusted so as to be format-compatible for regular, fault-free, format-dependent operation of the transport section 1, i.e. depending on the type and/or shape and/or size, in one possible embodiment also on the dimensions of the packaging means 2 in the direction of transport A or also transversely thereto. In FIG. 1, such format-dependent function elements that interact with the packaging means 2 are represented, as an example, as guide elements 3 and 4, which define the transport section 1 at the side and the mutual spacing between which has to or should be adjusted so as to be format-compatible in each case, i.e. in this case adjusted to the width of the packaging means 2 transversely to the direction of transport A, as is indicated by way of the double arrows B in FIG. 1. The guide elements 3 and 4 are also provided so as to be exchangeable, likewise to be adapted to the type and/or size of the packaging means 2 being handled.

In one possible embodiment of the present application, it is possible for the format-dependent function elements that have to be adjusted on the transport section 1 or within the overall system not only to be lateral guide elements but also other elements that interact with the packaging means 2, e.g. guide curves at inlet and outlet stars of processing machines or units, elements for dividing and/or bringing together a stream of packaging means, etc. In addition, a format-compatible adjustment refers not only to an adjustment of spacings but to every arbitrary adjustment to a format of a packaging means necessary and/or desired for setting up and/or changing over the system, e.g. changing the vertical or substantially vertical position and/or the sequence and/or the curving of the guides, etc.

The format-dependent adjustment of the guide elements 3 is effected via a plurality of adjusting devices 5, which are provided offset one to another at the side of the transport section 1 in the direction of transport A and of which two are shown for the purposes of clarity. Each adjusting device 5 essentially comprises, for example, an adjusting member 6, which, in the embodiment represented, is a threaded spindle, which is oriented with its axis horizontally or substantially horizontally and vertically or substantially vertically relative to the direction of transport A and is guided in a female thread on the conveyor 1, as well as a drive 7 (driving block) for the adjusting member 6, i.e. for rotating the threaded spindle that forms the adjusting member 6. A mobile adjusting device 9, provided with a motor, is temporarily couplable to the respective drive 7, which can also be provided with a crank-handle, or to a coupling 8 of the drive 7, it being possible to actuate the adjusting member 6 in a motor-driven manner via said mobile adjusting device 9 for the adjusting of the associated guide element 3 once it has been coupled. The mobile adjusting device 9 is in one possible embodiment a hand-operated device with a battery-operated or power-pack-operated electric motor.

Whereas separate adjusting devices 5 are provided in each case for the two guide elements 3 located on both sides of the transport section 1, the adjusting devices 5a for the two guide elements 4 provided on both sides of the transport section 1 are located in each case on one side of said transport section 1. Each adjusting device 5a is made up, in its turn, among other things, by an adjusting member 6a and a drive 7a with coupling 8 for the coupling of the adjusting device 9. The adjusting member 6a, in this case, for example, in the form of a threaded spindle with counterrotating threads, is designed in such a manner that by means of said adjusting member 6a, a symmetrical or substantially symmetrical adjusting of the guide elements 4 relative to a vertical or substantially vertical central plane of the conveyor 1 is possible.

The guide elements 3 and 4 are each detachably provided on the adjusting members 6 or 6a such that, where applicable, they can be exchanged for other guide elements in so far as this is necessary and/or desired for a format change.

Each adjusting device 5 and 5a defines an adjusting position that is clearly identified within the overall system by an independent identifier or identification, for example by an identification number.

A display 10 is provided, for example, at each drive 7 and 7a, on which display, among other things, the current setting of the adjusting device 5 or 5a and consequently of the guide element 3 or 4 is indicated in each case as the ACTUAL value. In addition, the REQUIRED value of the adjustment can also be displayed.

A central control unit 11 is additionally provided in the form of a computer, which has associated therewith, among other things, a display in the form of a screen 12 and an input keyboard 13. The adjustments necessary and/or desired for different formats of packaging means at the individual adjusting positions or the data of said adjustments, among other things, are stored as REQUIRED values in a storage means of the control unit 11, for example in data banks or tables, separately for each adjusting position. In addition, data for the function elements that interact with the packaging means 2 and are necessary and/or desired for the respective format of packaging means is also stored, among other things, in the storage means of the control unit 11.

When the system is adjusted and/or changed over, for example the transport section 1 to a new format of packaging means, the operating personnel instructed to carry out the format changeover can call up the corresponding data from the storage means of the control unit 11 so that said data, i.e. the necessary and/or desired format-compatible function elements interacting with the packaging means 2 and the necessary and/or desired format-compatible adjustments, can be displayed on the screen 12 for each adjusting position. The adjustments of the various adjusting devices 5 or 5a can then be carried out, by hand or in one possible embodiment using the adjusting device 9, to the format-compatible REQUIRED value taking account of the indication on the respective display 10.

In this case, not only the individual adjusting positions and the setting or REQUIRED values at said positions are displayed on the screen 12 but in one possible embodiment also the sequence in which the adjustment is to be performed at the adjusting positions is shown on the screen 12 in order to support the operating personnel in this way visually and in writing when making the adjustment or the format adjustment or the format changeover and to avoid, restrict, and/or minimize any possible incorrect adjustments.

To support the operating personnel, the system can also be designed such that the adjusting positions at which an adjustment is necessary and/or desired, are indicated on a diagram that is reproduced on the screen 12 and/or by an acoustic signal and/or by a light signal directly at the respective adjusting position, for example at the drive 7 or 7a at said position, as is indicated by the reference 14 in FIG. 1. Each display 14 is designed, for example, such that it switches off automatically once the adjustment has been performed. The switching off of the respective display 14 is effected then by the interaction between the mobile adjusting device 9 and the respective drive 7 or 7a, for example by docking the adjusting device 9 into said drive. The representation of the adjusting positions at which an adjustment is necessary and/or desired is in one possible embodiment effected on the screen 12 and/or the activating of the displays 14 at the adjusting positions occurs in each case one after another chronologically, in such a manner that once the adjustment has been successfully completed at one adjusting position, the next-following adjusting position at which an adjustment is necessary and/or desired is indicated on the screen 12 and/or the display 14 is activated at the next-following adjusting position such that the operating personnel can carry out the adjustment of the system guided by the control device 11.

However, the system is also designed additionally such that the adjusting at the individual adjusting positions or adjusting devices 5 and 5a is effected automatically or in a computer-controlled manner, in general in such a manner that once the adjusting device 9 has been attached to or coupled to a drive 7 or 7a and, where applicable, once the adjusting device 9 has been successfully activated, the adjusting member 6 or 6a is actuated in such a manner that the required and/or desired adjustment or adjustment to the REQUIRED value necessary and/or desired for the respective adjusting position is automatically effected in a motor-driven manner.

This can be achieved in various ways, for example by the values for the required and/or desired adjustment being transmitted to the individual adjusting positions or to the drives 7 or 7a at said positions by the central control device 11. The drives 7 or 7a are provided for this purpose with sufficient electronic intelligence, for example in the form of microprocessor-supported control electronics or a control device, to which, among other things, the REQUIRED values for the respective format-compatible adjustment are transmitted by the central control unit 11 via a suitable data transmission path, for example via a wireless data transmission path or a bus structure, and which, by comparing said REQUIRED values with the current setting of the respective adjusting member 6 or 6a (ACTUAL value), in conjunction with the coupled adjusting device 9, brings about the format-compatible adjustment and, once said adjustment has been achieved, the switching off of the device 9. The interaction necessary and/or desired here between the respective drive 7 or 7a and the adjusting device 9 is effected, for example, in a wireless manner via a transmission path in one possible embodiment realized for bi-directional data traffic, for example via a transmission path with infrared interfaces at the drives 7 or 7a and at the adjusting device 9. Other communication paths between the respective drive 7 or 7a and the adjusting device 9 are also possible. The content of the communication between the drive 7 or 7a and the coupled adjusting device 9 is, for example, among other things, the speed and/or direction of rotation and/or the overall angle of rotation or adjustment.

Once each of the adjusting devices 5 or 5a has been adjusted, a feedback signal is sent to the central unit 11 in order, for example, to determine and to indicate the next-following adjusting position and/or to inform or signal to the operating personnel that the adjustment performed in each case has been properly carried out. In this case, it is also possible, in principle, to develop the sequence for adjustment such that once an adjustment has been performed, this has to or should be indicated to the operating personnel on the screen 12 and has to or should be confirmed by the operating personnel by means of a corresponding input on the keyboard, for example, or a correction to the relevant adjustment has to or should be performed by the operating personnel before the adjustment can be performed at another adjusting position.

In principle, it is also possible to provide the adjusting device 9 with superior electronic intelligence, in such a manner that the adjustments for each adjusting position or for each adjusting device 5 or 5a necessary and/or desired for a format adjustment or a format changeover are stored in a storage means of the adjusting device 9 and that when the adjusting device 7 is coupled to the respective adjusting position or to the adjusting device 5 or 5a at said position, via a data transmission path between said adjusting position and the adjusting device 9, first of all the identification of the adjustment position and its current state is transmitted as an ACTUAL value to the docked adjusting device 9 and said device then, with consideration to said values and the required and/or desired value, carries out the adjustment of the function element that interacts with the packaging means, for example the guide element 3 or 4, to the required and/or desired position, a constant or substantially constant comparison being made during said adjustment between the REQUIRED value and the current ACTUAL value in each case. The data transmission between the respective adjusting position and the adjusting device 9 is effected, in its turn, via a wireless data path, for example realized for bi-directional data traffic, for example using infrared interfaces. For the identification of the respective adjusting position, an RFID chip, in which the identification of the adjustment position is stored, can be provided, for example, at the respective adjusting position along with a read unit at the adjusting device 9 that interacts with said chip.

Another possibility for automatic control of the format-compatible adjustment is that each current position or setting of each adjusting device 5 or 5a is transmitted via the data connection between the drives 7 and 7a and the central control unit 11 to the central control unit 11 as ACTUAL value, and that via a further connection, for example via a wireless connection, the adjusting device 9, coupled in each case to a drive 7 or 7a, in dependence on the ACTUAL value transmitted to the control unit 11 and the REQUIRED value stored in the control unit 11 for the corresponding adjustment position, is controlled in such a manner that a switching off of the adjustment device 9 is effected when the transmitted ACTUAL value corresponds to the REQUIRED value. As a modification of this, it is also possible to design the drives 7 and 7a in each case such that when the REQUIRED value of the adjustment is obtained, an interruption in the drive-side connection between the coupling 8 and the adjusting element 6 or 6a is effected in the drive 7 or 7a.

Figure 2:
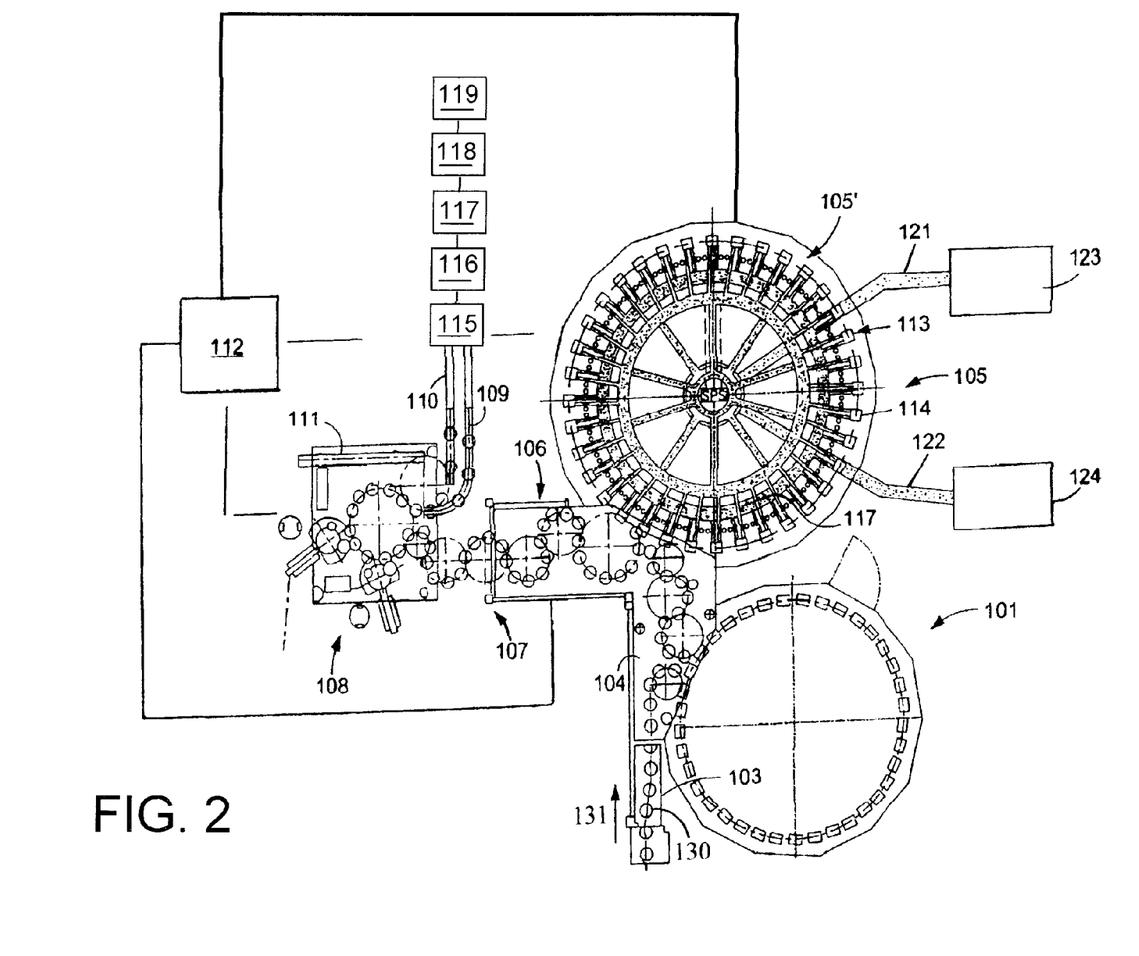
FIG. 2 shows schematically the main components of one possible embodiment example of a system for filling containers, for example a beverage bottling plant for filling bottles with at least one liquid beverage, in accordance with at least one possible embodiment, in which system or plant could possibly be utilized at least one aspect, or several aspects, of the embodiments disclosed herein.

FIG. 2 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 2, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Once the bottles 130 have been inspected, the correctly labeled bottles 130 may be transported to a sorter 115. The sorter 115 may be configured and disposed to distribute bottles into a plurality of rows. The plant may also comprise a transporter or grouper 116, which is configured and disposed to group a number of bottles 130 together with a pre-determined pitch spacing between each group of bottles 130. Once the bottles 130 have been grouped and spaced apart, the groups of bottles 130 may be transported to a machine 117, which is configured to place trays under the groups of bottles 130 and/or partitions between the bottles 130 of the groups. These groups of bottles 130 may then be transported to a shrink wrapping machine 118, which may wrap the groups of bottles 130 with a shrink wrap and then shrink the shrink wrap to form group sets or packages of bottles. The groups may then be transported to a stacking and/or palletizing machine 119, which places the shrinkwrapped groups on top of one another to form stacks.

The present application has been described above by way of possible embodiments. It is obvious that changes and conversions are possible without in any way departing from the teaching concept underlying the present application.

The present application relates to a system for processing packaging means 2 moved on a transport path 1 by the system, having a plurality of format-dependent functional elements 3, 4 on said transport path working together with the packaging means, and adjusting devices 5, 5a at adjusting positions of the system for adjusting the format-dependent functional elements working together with the packaging means correctly for a format.

One feature or aspect of an embodiment is believed at the time of the filing of this patent application to possibly reside broadly in a system for processing and/or handling and/or treating packaging means that are moved through the system on a transport section 1, said system including a plurality of format-dependent function elements 3, 4, which are provided on said transport section and interact with the packaging means 2, as well as adjusting devices 5, 5a that are provided at adjusting positions of the system for a format-compatible adjustment of the format-dependent function elements 3, 4 that interact with the packaging means 2, comprising a central control unit 11, in which at least the format-compatible adjustments necessary and/or desired at the adjusting positions for different formats of packaging means are stored in a storage medium as setting data or REQUIRED values, said control unit providing said data for a format adjustment and/or format changeover of the system.

Another feature or aspect of an embodiment is believed at the time of the filing of this patent application to possibly reside broadly in the system, comprising at least one mobile adjusting device 9, which has a motor-driven drive and is couplable to the adjusting devices 5, 5a of the function elements 3, 4 for a motor-driven, format-compatible adjustment of said format-dependent function elements 3, 4.

Yet another feature or aspect of an embodiment is believed at the time of the filing of this patent application to possibly reside broadly in a system for handling and/or treating packaging means that are moved through the system on a transport section 1, said system including a plurality of format-dependent function elements 3, 4, which are provided on said transport section and interact with the packaging means 2, as well as adjusting devices 5, 5a that are provided at adjusting positions of the system for a format-compatible adjustment of the format-dependent function elements 3, 4 that interact with the packaging means 2, comprising at least one mobile adjusting device 9, which has a motor-driven drive and is couplable to the adjusting devices 5, 5a of the function elements 3, 4 for a motor-driven, format-compatible adjustment of said format-dependent function elements 3, 4.

Still another feature or aspect of an embodiment is believed at the time of the filing of this patent application to possibly reside broadly in the system, comprising a central control unit 11, in which at least the format-compatible adjustments necessary and/or desired at the adjusting positions for different formats of packaging means are stored in a storage medium as setting data or REQUIRED values, said control unit providing said data for a format adjustment and/or format changeover in the system.

A further feature or aspect of an embodiment is believed at the time of the filing of this patent application to possibly reside broadly in the system, wherein the adjusting device 9 is a battery-operated or power-pack-operated device.

Another feature or aspect of an embodiment is believed at the time of the filing of this patent application to possibly reside broadly in the system, wherein at the adjusting positions or at the adjusting devices 5, 5a at said positions, means are provided for detecting the actual position or actual setting of the adjusting device 5, 5a or of the associated format-dependent function element as ACTUAL value.

Yet another feature or aspect of an embodiment is believed at the time of the filing of this patent application to possibly reside broadly in the system, wherein at the adjusting positions or at the adjusting devices 5, 5a, means are provided for the optical display 10 of at least the respective actual position or actual setting of the relevant adjusting device 5, 5a or of the associated format-dependent function element 3, 4.

Still another feature or aspect of an embodiment is believed at the time of the filing of this patent application to possibly reside broadly in the system, wherein the central control unit 11 has at least one screen 12 for displaying the format-compatible adjustments that are to be performed and/or have been performed at the individual adjusting positions or at the adjusting devices 5, 5a at said positions.

A further feature or aspect of an embodiment is believed at the time of the filing of this patent application to possibly reside broadly in the system, wherein the at least one display device 12 of the central control unit 11 is realized for a display of those adjusting positions that have to be adjusted when there is a format adjustment and/or a format changeover.

Another feature or aspect of an embodiment is believed at the time of the filing of this patent application to possibly reside broadly in the system, wherein the system has optical and/or acoustic displays 14 at the adjusting positions or at the adjusting devices 5, 5b at said positions, said displays being activatable by the central control unit 11 for the displaying of those adjusting positions at which an adjustment is necessary and/or desired.

Yet another feature or aspect of an embodiment is believed at the time of the filing of this patent application to possibly reside broadly in the system, wherein the adjusting positions or the adjusting devices 5, 5a at said positions or a group of adjusting positions or adjusting devices 5a are each provided with control electronics, each of which is connected to the central control unit 11 by means of a data transmission path, for example by means of a bus structure or a wireless data transmission path.

Still another feature or aspect of an embodiment is believed at the time of the filing of this patent application to possibly reside broadly in the system, wherein the setting data necessary and/or desired for the respective format-compatible adjustment (required and/or desired adjustment) is transmitted to the control electronics of each adjusting position as REQUIRED data, and in that the respective control electronics controls the coupled adjusting device 9, e.g. its speed of rotation and/or direction of rotation and/or angle of rotation, taking into account said REQUIRED value and the current actual position or actual setting (ACTUAL value) of the relevant adjusting positions or of their adjusting device 5, 5a and, where there is agreement between the REQUIRED value and the ACTUAL value, the adjustment is terminated, for example the adjusting device 9 is switched off or the connection to the adjusting device 9 on the drive side is interrupted.

A further feature or aspect of an embodiment is believed at the time of the filing of this patent application to possibly reside broadly in the system, wherein the control electronics of each adjusting position transmit the current actual position or actual adjustment as ACTUAL value to the central control unit 11 and said control unit, taking into account the ACTUAL value and the REQUIRED value stored in the central control unit 11, controls the adjustment by way of the adjusting device 9, for example by controlling the adjusting device 9 and/or the drive-side connection to the adjusting device 9 within the relevant adjusting device 5, 5a.

One feature or aspect of an embodiment is believed at the time of the filing of this patent application to possibly reside broadly in the system, wherein the at least one adjusting device 9 is provided with control electronics, to which, when coupled to an adjusting device 5, 5a, at least the actual position or actual setting of the adjusting device 5, 5a is transmitted as ACTUAL value, and in that the control electronics control the drive of the adjusting device 9 taking into account said ACTUAL value and the REQUIRED value associated with the adjusting position.

Another feature or aspect of an embodiment is believed at the time of the filing of this patent application to possibly reside broadly in the system, wherein the setting data is transmitted by the control unit 11 to the control electronics of the adjusting device 9 as REQUIRED value via a data transmission path, for example via a wireless data transmission path, and/or in that the adjusting device 9 has an interface for connecting to the central control unit 11 for reading the setting data into the control electronics.

Yet another feature or aspect of an embodiment is believed at the time of the filing of this patent application to possibly reside broadly in the system, wherein the adjusting device is a battery-operated or power-pack-operated and/or hand-operated device.

Still another feature or aspect of an embodiment is believed at the time of the filing of this patent application to possibly reside broadly in the system, wherein the at least one adjusting device 9 is controllable by means of the respective adjusting position or by means of the adjusting device 5, 5a at said position.

A further feature or aspect of an embodiment is believed at the time of the filing of this patent application to possibly reside broadly in the system, wherein the at least one adjusting device 9 is controllable by means of the central control unit 11.

Another feature or aspect of an embodiment is believed at the time of the filing of this patent application to possibly reside broadly in a method for adjusting the format or changing-over the format of a system for processing and/or handling and/or treating packaging means 2, which are moved through the system on a transport section 1, said system having a plurality of format-dependent function elements 3, 4 that are provided on the transport section and interact with the packaging means 2 as well as adjusting devices 5, 5a that are provided at adjusting positions of the system for a format-compatible adjustment of the format-dependent function elements that interact with the packaging means 2, wherein the adjusting of the system is effected in a manner supported by the control unit 11, in which at least the format-compatible adjustments necessary and/or desired at the adjusting positions for different formats of packaging means are stored in a storage medium as setting data or required and/or desired values, said control unit providing said data for a format adjustment and/or format changeover.

Yet another feature or aspect of an embodiment is believed at the time of the filing of this patent application to possibly reside broadly in the method, wherein the format-compatible adjustment of the format-dependent function elements 3, 4 is effected at the adjusting devices 5, 5a by means of a mobile adjusting device that is couplable to said adjusting devices and has a motor-driven drive.

Still another feature or aspect of an embodiment is believed at the time of the filing of this patent application to possibly reside broadly in a method for adjusting the format or changing-over the format of a system for processing and/or handling and/or treating packaging means 2, which are moved through the system on a transport section 1, said system having a plurality of format-dependent function elements 3, 4 that are provided on the transport section and interact with the packaging means 2 as well as adjusting devices 5, 5a that are provided at adjusting positions of the system for a format-compatible adjustment of the format-dependent function elements that interact with the packaging means 2, wherein the format-compatible adjustment of the format-dependent function elements 3, 4 is effected at the adjusting devices 5, 5a by means of a mobile adjusting device that is couplable to said adjusting devices and has a motor-driven drive.

A further feature or aspect of an embodiment is believed at the time of the filing of this patent application to possibly reside broadly in the method, wherein the adjusting of the system is effected in a manner supported by the control unit 11, in which at least the format-compatible adjustments necessary and/or desired at the adjusting positions for different formats of packaging means are stored in a storage medium as setting data or required and/or desired values, said control unit providing said data for a format adjustment and/or format changeover.

Another feature or aspect of an embodiment is believed at the time of the filing of this patent application to possibly reside broadly in the method, wherein the respective format-compatible adjustment is effected in a controlled manner by the central control unit 11.

Yet another feature or aspect of an embodiment is believed at the time of the filing of this patent application to possibly reside broadly in the method, wherein the respective format-compatible adjustment is effected by means of control electronics provided at the respective adjusting position or at a group of adjusting positions.

Still another feature or aspect of an embodiment is believed at the time of the filing of this patent application to possibly reside broadly in the method, wherein the respective format-compatible adjustment is effected taking into account an actual value of the current setting and the REQUIRED value stored in the control unit for the relevant adjusting position.

A further feature or aspect of an embodiment is believed at the time of the filing of this patent application to possibly reside broadly in the method, wherein the control of the adjusting device 9 is effected by means of the central control unit 11.

Another feature or aspect of an embodiment is believed at the time of the filing of this patent application to possibly reside broadly in the method, wherein the control of the adjusting device 9 is effected by means of the adjusting position to which the adjusting device 9 is coupled.

Yet another feature or aspect of an embodiment is believed at the time of the filing of this patent application to possibly reside broadly in the method, wherein the central control unit 11 presets the sequence in which the format-compatible adjustment is performed or is to be performed at the adjusting positions and/or causes a display of said sequence.

Still another feature or aspect of an embodiment is believed at the time of the filing of this patent application to possibly reside broadly in the method, wherein the central control unit activates displays 14 at the adjusting positions for displaying the sequence of the adjustments.

A further feature or aspect of an embodiment is believed at the time of the filing of this patent application to possibly reside broadly in the method, comprising the use of an adjusting device 9 in the form of a battery-operated or power-pack-operated hand-held device.

Another feature or aspect of an embodiment is believed at the time of the filing of this patent application to possibly reside broadly in a system for processing and/or handling and/or treating packaging means that are moved through the system on a transport section 1, with a plurality of format-dependent function elements 3, 4 which are provided on said transport section and interact with the packaging means 2, as well as adjusting devices 5, 5a that are provided at adjusting positions of the system for a format-compatible adjustment of the format-dependent function elements 3, 4 that interact with the packaging means 2 with at least one mobile adjusting device 9 that has a motor drive and is couplable to the adjusting device 5, 5a of these function elements 3, 4, and with a central control unit 11 in which at least the format-compatible adjustments necessary at the adjusting positions for different formats of packaging means are stored in a storage medium as setting data or REQUIRED values, and these data are provided for a format adjustment and/or format changeover of the system, wherein at the adjustment positions or on the adjusting devices 5, 5a located there, there are means for the detection of the current position or setting of the adjustment device 5, 5a or of the corresponding format-compatible function element as an ACTUAL value and that the central control unit 11 performs the format-compatible setting taking the ACTUAL value at that location and of the stored REQUIRED value for the adjustment position in question.

Yet another feature or aspect of an embodiment is believed at the time of the filing of this patent application to possibly reside broadly in the system, wherein the adjusting positions or the adjusting devices 5, 5a at said positions or a group of adjusting positions or adjusting devices 5a are each provided with control electronics, each of which is connected to the central control unit 11 by means of a data transmission path, for example by means of a bus structure or a wireless data transmission path, that the control electronics of each adjusting position transmit the current actual position or actual adjustment as ACTUAL value to the central control unit 11 and said control unit, taking into account the ACTUAL value and the REQUIRED value stored in the central control unit 11, controls the adjustment by way of the adjusting device 9.

Still another feature or aspect of an embodiment is believed at the time of the filing of this patent application to possibly reside broadly in the system, wherein the central control unit 11 controls the adjustment by controlling the adjusting device 9 and/or the drive-side connection to the adjusting device 9 within the relevant adjusting device 5, 5a.

A further feature or aspect of an embodiment is believed at the time of the filing of this patent application to possibly reside broadly in a system for handling and/or treating packaging means that are moved through the system on a transport section 1, said system including a plurality of format-dependent function elements 3, 4, which are provided on said transport section and interact with the packaging means 2, as well as adjusting devices 5, 5a that are provided at adjusting positions of the system for a format-compatible adjustment of the format-dependent function elements 3, 4 that interact with the packaging means 2, comprising at least one mobile adjusting device 9, which has a motor-driven drive and is couplable to the adjusting devices 5, 5a of the function elements 3, 4 for a motor-driven, format-compatible adjustment of said format-dependent function elements 3, 4, and with a central control unit 11, in which at least the format-compatible adjustments necessary and/or desired at the adjusting positions for different formats of packaging means are stored in a storage medium as setting data or REQUIRED values, said control unit providing said data for a format adjustment and/or format changeover in the system, wherein the adjusting positions or the adjusting devices 5, 5a at said positions or a group of adjusting positions or adjusting devices 5a are each provided with control electronics, each of which is connected to the central control unit 11 by means of a data transmission path, for example by means of a bus structure or a wireless data transmission path, that the setting data necessary and/or desired for the respective format-compatible adjustment (required and/or desired adjustment) is transmitted to the control electronics of each adjusting position as REQUIRED data, and that the respective control electronics controls the coupled adjusting device 9, e.g. its speed of rotation and/or direction of rotation and/or angle of rotation, taking into account said REQUIRED value and the current actual position or actual setting (ACTUAL value) of the relevant adjusting positions or of their adjusting device 5, 5a and, where there is agreement between the REQUIRED value and the ACTUAL value, the adjustment is terminated, for example the adjusting device 9 is switched off or the connection to the adjusting device 9 on the drive side is interrupted.

One feature or aspect of an embodiment is believed at the time of the filing of this patent application to possibly reside broadly in the system, wherein at the adjusting positions or at the adjusting devices 5, 5a at said positions, means are provided for detecting the actual position or actual setting of the adjusting device 5, 5a or of the associated format-dependent function element as ACTUAL value.

Another feature or aspect of an embodiment is believed at the time of the filing of this patent application to possibly reside broadly in the system, wherein where there is agreement between the REQUIRED value and the ACTUAL value, the respective control electronics switches off the adjusting device 9 or interrupts the connection to the adjusting device 9 on the drive side.

Yet another feature or aspect of an embodiment is believed at the time of the filing of this patent application to possibly reside broadly in the system, wherein the adjusting device 9 is a battery-operated or power-pack-operated device and/or hand-operated device.

Still another feature or aspect of an embodiment is believed at the time of the filing of this patent application to possibly reside broadly in the system, wherein at the adjusting positions or at the adjusting devices 5, 5a, means are provided for the optical display 10 of at least the respective actual position or actual setting of the relevant adjusting device 5, 5a or of the associated format-dependent function element 3, 4.

A further feature or aspect of an embodiment is believed at the time of the filing of this patent application to possibly reside broadly in the system, wherein the central control unit 11 has at least one screen 12 for displaying the format-compatible adjustments that are to be performed and/or have been performed at the individual adjusting positions or at the adjusting devices 5, 5a at said positions.

Another feature or aspect of an embodiment is believed at the time of the filing of this patent application to possibly reside broadly in the system, wherein the central control unit 11 has at least one display device 12 for a display of those adjusting positions that must or should be adjusted when there is a format adjustment and/or a format changeover.

Yet another feature or aspect of an embodiment is believed at the time of the filing of this patent application to possibly reside broadly in the system, wherein the system has optical and/or acoustic displays 14 at the adjusting positions or at the adjusting devices 5, 5b at said positions, said displays being automatable by the central control unit 11 for the displaying of those adjusting positions at which an adjustment is necessary and/or desired.

Still another feature or aspect of an embodiment is believed at the time of the filing of this patent application to possibly reside broadly in the system, wherein the at least one adjusting device 9 is provided with control electronics, to which, when coupled to an adjusting device 5, 5a, at least the actual position or actual setting of the adjusting device 5, 5a is transmitted as ACTUAL value, and in that the control electronics control the drive of the adjusting device 9 taking into account said ACTUAL value and the REQUIRED value associated with the adjusting position.

A further feature or aspect of an embodiment is believed at the time of the filing of this patent application to possibly reside broadly in the system, wherein the setting data is transmitted by the control unit 11 to the control electronics of the adjusting device 9 as REQUIRED value via a data transmission path, for example via a wireless data transmission path, and/or in that the adjusting device 9 has an interface for connecting to the central control unit 11 for reading the setting data into the control electronics.

Another feature or aspect of an embodiment is believed at the time of the filing of this patent application to possibly reside broadly in a method for adjusting the format or changing-over the format of a system for processing and/or handling and/or treating packaging means 2, which are moved through the system on a transport section 1, said system having a plurality of format-dependent function elements 3, 4 that are provided on the transport section and interact with the packaging means 2 as well as adjusting devices 5, 5a that are provided at adjusting positions of the system for a format-compatible adjustment of the format-dependent function elements that interact with the packaging means 2, wherein the format-compatible adjustment of the format-dependent function elements 3, 4 is effected at the adjusting devices 5, 5a by means of a mobile adjusting device that is couplable to said adjusting devices and has a motor-driven drive, and is effected in a manner supported by the control unit 11, in which at least the format-compatible adjustments necessary and/or desired at the adjusting positions for different formats of packaging means are stored in a storage medium as setting data or required values, said control unit providing said data for a format adjustment and/or format changeover, characterized in that the respective format-compatible adjustment is effected in a controlled manner by the central control unit 11 or by control electronics provided at the respective adjusting position or at a group of adjusting positions, taking into account an actual value of the current setting and the REQUIRED value stored in the control unit for the relevant adjusting position.

Yet another feature or aspect of an embodiment is believed at the time of the filing of this patent application to possibly reside broadly in the method, wherein the control of the adjusting device 9 is effected by means of the central control unit 11.

Still another feature or aspect of an embodiment is believed at the time of the filing of this patent application to possibly reside broadly in the method, wherein the control of the adjusting device 9 is effected by means of the adjusting position to which the adjusting device 9 is coupled.

A further feature or aspect of an embodiment is believed at the time of the filing of this patent application to possibly reside broadly in the method, wherein the central control unit 11 presets the sequence in which the format-compatible adjustment is performed or is to be performed at the adjusting positions and/or causes a display of said sequence.

One feature or aspect of an embodiment is believed at the time of the filing of this patent application to possibly reside broadly in the method, wherein the central control unit activates displays 14 at the adjusting positions for displaying the sequence of the adjustments.

Another feature or aspect of an embodiment is believed at the time of the filing of this patent application to possibly reside broadly in the method, comprising the use of an adjusting device 9 in the form of a battery-operated or power-pack-operated hand-held device.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Transport section
2 Packaging means
3, 4 Guide elements
5, 5a Adjusting device
6, 6a Adjusting member
7, 7a Drive or actuating device for the adjusting member 6 or 6a
8 Coupling
9 Adjusting device
10 Display
11 Central control device
12 Screen
13 Input keyboard
14 Display
A Direction of transport
B Adjustment

What is claimed is:

1. A container handling arrangement comprising:
    container handling structures configured to handle different formats and/or types of containers being moved on an adjacent transport arrangement;
    positioning devices configured to move said container handling structures to different desired positions according to the format and/or type of containers to be handled;
    detection devices configured to detect current positions of said container handling structures prior to adjustment;
    a central control unit configured to calculate an adjustment of the positions of said container handling structures, based on the detected, current positions of said container handling structures and the desired positions of said container handling structures, upon a change in the format and/or type of containers to be handled; and
    a mobile adjusting device being movable from one positioning device to another, and being configured to activate said positioning devices to move said container handling structures from their current positions directly to the desired positions in accordance with the calculated adjustment.

2. The container handling arrangement according to claim 1, wherein said central control unit is configured to terminate adjustment by deactivating said mobile adjusting device upon completion of the calculated adjustment.

3. The container handling arrangement according to claim 2, wherein:
    said central control unit is configured to deactivate said mobile adjusting device by turning off said mobile adjusting device or by interrupting the operative connection between said mobile adjusting device and said positioning device; and
    each of said positioning devices is operatively connected to said central control unit by a databus or wireless connection.

4. The container handling arrangement according to claim 3, wherein the container handling arrangement comprises optical display arrangements disposed at or adjacent said positioning devices, each configured to display at least the respective current position or current setting of its positioning device or its container handling structure.

5. The container handling arrangement according to claim 4, wherein:
    said central control unit comprises a display arrangement configured to display: the adjustments that are to be performed and/or have been performed by said positioning devices, and which of said positioning devices must be activated for adjustment upon a change in format of said container units; and
    the container handling arrangement comprises optical and/or acoustic displays disposed at or adjacent each of said positioning devices, each of which is configured to be controlled by said central control unit to display which of said positioning devices must be activated for adjustment and/or in what order said positioning devices are to be activated.

6. A container handling arrangement comprising:
    container handling structures configured to handle different formats and/or types of containers being moved on an adjacent transport arrangement;
    positioning devices configured to move said container handling structures to different desired positions according to the format and/or type of containers to be handled;
    a mobile adjusting device comprising a motor drive arrangement configured to individually engage and activate each of said positioning devices to move said container handling structures; and
    one of (A) and (B):
        (A) each of said positioning devices comprises an electronic control device configured to store a desired position of a corresponding container handling structure, and control the operation of said mobile adjusting device to move said corresponding container handling structure from its current position prior to adjustment to said desired position;
        (B) said mobile adjusting device comprises an electronic control;
        each of said positioning devices is configured to transmit a current position of a corresponding container handling structure prior to adjustment to said mobile adjusting device, upon engagement of said mobile adjusting device and said positioning device; and
        said electronic control is configured to determine a desired adjustment for each of said container handling structures based on said current position of said corresponding container handling and a desired position according to the format and/or type of containers to be handled.

7. The container handling arrangement according to claim 6, wherein each of said positioning devices is configured to control at least one of: speed of rotation, direction of rotation, and angle of rotation of said mobile adjusting device.

8. The container handling arrangement according to claim 7, wherein said handling arrangement comprises detection devices positioned adjacent said positioning devices and configured to detect the current position or current setting of said positioning devices or said container handling structures.

9. The container handling arrangement according to claim 8, wherein each of said control devices is configured, upon the current position of a corresponding container handling structure matching a desired position, to deactivate said mobile adjusting device by turning off said mobile adjusting device or by interrupting the operative connection between said mobile adjusting device and said positioning device.

10. The container handling arrangement according to claim 9, wherein said at least one mobile adjusting device is a battery-operated or power-pack-operated device and/or a hand-operated device.

11. The container handling arrangement according to claim 6, wherein said electronic control is configured to commence adjustment by activating said mobile adjusting device, and to terminate adjustment by deactivating said mobile adjusting device upon completion of the desired adjustment.

12. The container handling arrangement according to claim 11, wherein:
  the container handling arrangement comprises a central control unit configured to store positioning data relating to the formats and/or types of containers to be handled;
  said mobile adjusting device is configured to connect to said central control unit to receive positioning data via at least one of: a wireless connection and an interface connection.

13. A method of handling containers comprising:
  handling containers being moved on an adjacent transport arrangement using container handling structures configured to be adjusted by positioning devices;
  selecting a different format and/or type of containers to be handled;
  moving a mobile adjusting device from one positioning device to another, and activating, with said mobile adjusting device, each of said positioning devices to move said container handling structures from a current position prior to adjustment directly to a desired position in accordance with positioning data corresponding to the different format and/or type of containers to be handled;
  detecting and then transmitting current positions of said container handling structures to a central control unit;
  calculating an adjustment of the positions of said container handling structures, based on the detected, current positions of said container handling structures and the desired positions of said container handling structures, and then commencing adjustment by activating said mobile adjusting device with said central control unit; and
  terminating adjustment by deactivating said mobile adjusting device with said central control unit upon completion of the desired adjustment.

14. The method according to claim 13, wherein said method further comprises setting the sequence of activation of said positioning devices using said central control unit to achieve the desired adjustment, and displaying the sequence of the adjustments on at least one display arrangement disposed at or adjacent said positioning devices.

15. The method according to claim 14, wherein said step of activating, using said mobile adjusting device, said positioning devices comprises using a battery-operated or power-pack-operated and/or handheld mobile adjusting device.

16. A method of handling containers comprising:
  handling containers being moved on an adjacent transport arrangement using container handling structures configured to be adjusted by positioning devices;
  selecting a different format and/or type of containers to be handled;
  moving a mobile adjusting device from one positioning device to another, and activating, with said mobile adjusting device, each of said positioning devices to move said container handling structures from a current position prior to adjustment directly to a desired position in accordance with positioning data corresponding to the different format and/or type of containers to be handled;
  storing, in an electronic control device of each of said positioning devices, a desired position of the container handling structure corresponding to said positioning device; and
  controlling the operation of said mobile adjusting device with said electronic control device to move said corresponding container handling structure from its current position to said desired position;
  said step of controlling comprises controlling at least one of: speed of rotation, direction of rotation, and angle of rotation of said mobile adjusting device;
  said handling arrangement comprises detection devices positioned adjacent said positioning devices and configured to detect the current position or current setting of said positioning devices or said container handling structures; and
  upon the current position of a corresponding container handling structure matching a desired position, deactivating, using said control devices, said mobile adjusting device by turning off said mobile adjusting device or by interrupting the operative connection between said mobile adjusting device and said positioning device.

\* \* \* \* \*